MULTI-LINE HOLDING CIRCUIT FOR SUBSCRIBERS' STATIONS

Filed Sept. 30, 1965 Sheet 1 of 2

INVENTORS R. L. HECK
G. E. HUTTON

BY Howard R Popper
ATTORNEY

United States Patent Office 3,427,407

Patented Feb. 11, 1969

3,427,407

MULTI-LINE HOLDING CIRCUIT FOR SUBSCRIBERS' STATIONS

Robert L. Heck and Gerald E. Hutton, Springfield, Ill., assignors to American Telephone and Telegraph Company, New York, N.Y., a corporation of New York Filed Sept. 30, 1965, Ser. No. 491,522
U.S. Cl. 179—99 6 Claims
Int. Cl. H04m 1/00

ABSTRACT OF THE DISCLOSURE

In a multi-line substation set, nonlocking pick-up keys enabling party to connect or disconnect station to a line; and enabling party to hold call by operating any other pick-up key.

Our invention relates to communication systems, and more particularly to key telephone systems in which several telephone lines are accessible to one or more stations.

The need for access to several telephone lines at one station has led to the development of many different key telephone systems. These systems generally employ arrangements of buttons or "keys" which permit a party at one of the stations to pick up and answer a call on one of the lines accessible to the station. These key telephone systems also enable the calling line to be placed on hold status if this latter condition is appropriate.

Calls in those systems are usually answered by depressing a locking line pick-up key associated with the calling line and removing the telephone handset from the cradle to operate the switchhook. A call is held in those systems by operating the hold key which releases the heretofore locked line pick-up key.

Our invention overcomes the need for the switchhook and the hold key. More particularly, we have invented a circuit which enables a party to connect or disconnect a station to a line simply by manipulating a nonlocking line pick-up key associated with the line. A call is held, in accordance with our invention, by operating a line pick-up key for some line accessible to the station other than that line on which the call is to be held. This circuit is particularly useful to invalids, such as victims of poliomyelitis, who may find it extremely difficult to perform particular combinations of manipulation. For example, such a person may have the capacity to operate a few pushbuttons but may not be able to lift a conventional handset from the telephone cradle. In addition, the fewer the number of such pushbuttons required to perform telephone control functions, the less tiring its operation would be.

It is an object of our invention to provide a key telephone system that does not require switchhooks and hold keys.

It is another object of our invention to use only one key for each line to provide key telephone answering and hold services.

It is a further object of our invention to provide a key telephone station that is fully controlled by only one nonlocking key for each line available to the station.

In accordance with our invention, we have provided a circuit that responds to the operation of a first line pick-up key by extending a talking connection between the telephone set and the line circuit associated with the key. Our circuit responds to the operation of a second line pick-up key (which controls another line available to the station) by placing the first line on hold status and connecting the second line to the station. A pick-up line is released by reoperating the key associated with the line to be released. These functions are accomplished without a switchhook or a hold key in a way that is fully compatible with conventional telephone systems and line circuitry.

More specifically, according to one aspect of our invention, there is one nonlocking line pick-up key at the station for each available line. Sets of two relays are provided for each line and are arranged to lock in operation when the reespective line pick-up key is manipulated. contacts responsive to the energized relays are actuated to connect the station with the line. Reoperation of the line pick-up key de-energizes the relays and causes the contacts to release and disconnect the station from the line.

According to another aspect of our invention, we place active lines on hold status by interposing contacts responsive to one set of relays in the other lines available to the station. Manipulating one of the line pick-up keys and energizing the respective set of relays operate these contacts and cause holding impedances to be applied to the other active lines.

Accordingly, it is a feature of our invention to provide relays for each line which connect the station to the respective line in response only to the operation of the line pick-up key.

It is another feature of our invention to operate contacts in the other lines accessible to the station, in response to the energization of the relays associated with one line with which connection is sought, to place the other lines on hold status.

These and other objects and features of our invention will become more apparent from the following description taken in conjunction with the drawing, in which.

Figure 1:
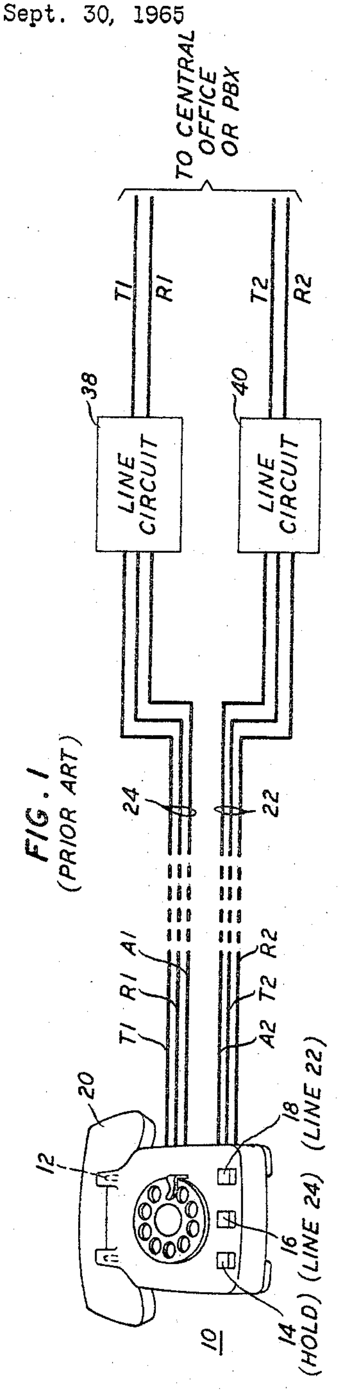
FIG. 1 (PRIOR ART)
FIG. 1 illustrates in block diagram form a key telephone station characterizing the prior art, which is shown for purposes of contrast.

A brief examination of a prior art key telephone station, as shown in FIG. 1, will define more clearly the characteristics of our improved circuit. Thus, station 10 has the well-known switchhook 12, nonlocking hold key 14, and locking line pick-up keys 16 and 18. To answer or place a call on line 22, pick-up key 18 is depressed and handset 20 is removed from the station cradle to operate switchhook 12.

A call is held on line 22 by operating nonlocking hold key 14 which releases locked pick-up key 18 from the depressed position and places line 22 on hold status. Line 24, controlled by pick-up key 16, is connected to station 10 by depressing key 16. Consequently, station 10 may be transferred between lines 22 and 24 by appropriately operating and reoperating the hold and the line pick-up keys.

A call on any one of the lines is terminated by replacing handset 20 on the station cradle to restore switchhook 12.

Figure 2:
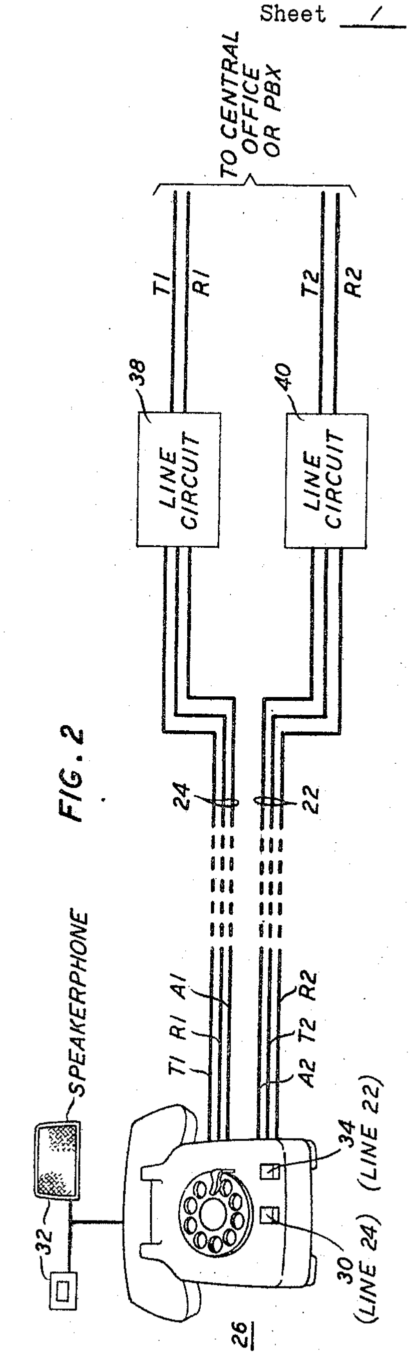
FIG. 2 shows in block diagram form a key telephone station according to one embodiment of the present invention.

As shown in FIG. 2, our invention obviates the need for switchhook and hold keys. Accordingly, station 26 is connected to line 24 by depressing and releasing line pick-up key 30. Line pick-up key 30, according to this specific embodiment of the invention, is of the conventional nonlocking type. Nonlocking keys remain depressed only during the downward application of direct manual force, and are biased to spring automatically into the normal released position when the manual force is removed. Manipulating key 30 in this manner, initiates circuit operations which connect speakerphone 32 to tip T1 and ring R1 leads of line 24. Thus the station user need not lift the telephone handset from the cradle. To hold a call on line 24, line pick-up key 34, which connects station 26 to line 22 is manipulated to couple speakerphone 32 to the tip and ring leads of line 22 and place line 24 on hold status, as hereinafter described.

Figure 3:
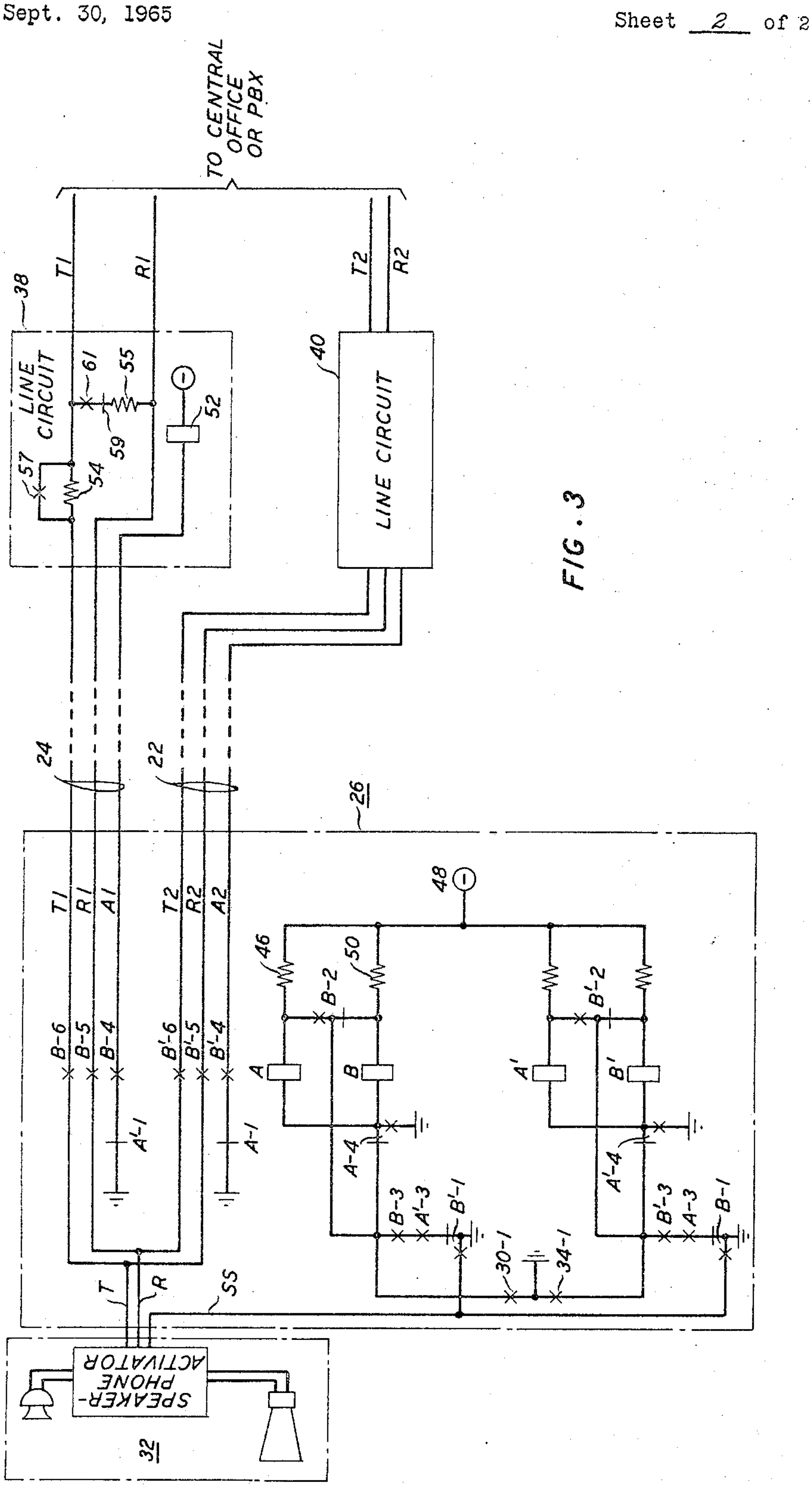
FIG. 3 is a schematic diagram of a key telephone circuit as illustrated in block diagram form in FIG. 2.

More specifically, as shown in FIG. 3, station 26 is provided with relays A and B that connect and disconnect speakerphone 32 from line 24 in response to the operation of nonlocking pick-up key 30 (FIG. 2). Depressing and releasing pick-up key 30 operates make contacts 30–1 to establish a temporary circuit for energizing the winding of relay A. Activated relay A establishes a locking ground for both relays A and B. Relay B, when energized, operates make contacts B–4, B–5, and B–6 in leads A1, R1, and T1, respectively, to couple speakerphone 32 to line 24 and complete the connection between station 26 and the central office or private branch exchange through line circuit 38. The operation of transfer make contact B–1 grounds lead SS to turn on the speakerphone for voice operation. Line circuit 38, serving line 24, is described in more complete detail in the copending patent application of C. E. Morse and J. P. Smith, Ser. No. 246,905, filed Dec. 26, 1962, now Patent 3,239,610, issued Mar. 8, 1966, of which line circuit only so much will be shown and described as is necessary to completely illustrate the operation of our key telephone station. Speakerphone operation is described in W. F. Clemency and W. D. Goodale, Jr., U.S. Patent No. 3,171,901, granted on Mar. 2, 1965.

In accordance with another aspect of our invention, line 24 is placed on hold status by manipulating nonlocking pick-up key 34 (FIG. 2) associated with line 22 to operate make contacts 34–1 and energize relays A′ and B′. Energized relay A′ operates break contacts A′–1 in lead A1. Line circuit 38, more fully described in the aforementioned C. E. Morse et al. patent application, responds to this break in circuit continuity by causing relay 52 to release and connect holding bridge resistors 54 and 55 across leads T1 and R1. Relay A′ also operates make contacts A′–3 to shunt down the winding of relay A. Relay B′, when energized, operates break contacts B′–1 which opens the holding path for relay B. De-energized relay B opens make contacts B–4, B–5, and B–6 in leads A1, R1 and T1 to disconnect station 26 from held line 24. Relay B′, however, operates make contacts B′–4, B′–5, and B′–6 to connect station 26 to line 22.

Line 22 is released by reoperating pick-up key 34 to close make contacts 34–1 and shunt down relays A′ and B′ in succession. De-energizing relay B′ simultaneously restores contacts B′–4, B′–5, and B′–6 to disconnect station 26 and terminate the call on line 22.

*Line pickup*

In accordance with our invention, as shown in FIG. 3, line 24 is picked up at station 26 without the aid of a switchhook merely by depressing and releasing nonlocking pick-up key 30. Manipulating key 30 operates make contacts 30–1 which establish a temporary circuit for the winding of relay A from ground through operated make contacts 30–1, transfer break contacts A–4, the winding of relay A, and resistor 46 to power supply 48. Energized relay A locks in operation through operated transfer make contacts A–4 which provide a path to ground for the winding of relay A. Contacts 30–1, until released, shunt down resistance battery over a path including transfer break contacts B–2 thereby temporarily preventing relay B from operating. When contacts 30–1 are released relay B operates over a path which extends from ground through operated transfer make contacts A–4, the winding of relay B, and resistor 50 to power supply 48. Energized relay B operates contacts B–4, B–5, and B–6 in leads A1, R1, and T1, respectively, of line 24. These operated contacts complete the circuit that connects line 24 from a central office or private branch exchange to station 26.

Operated make contact B–1 grounds lead SS to turn on speakerphone 32.

*Holding*

As shown in FIG. 3, a call is held on line 24 by manipulating key 34 (FIG. 2) that controls line 22. Key 34 operates make contacts 34–1 to establish a circuit for energizing relays A′ and B′ in the same manner as hereinbefore described in connection with relays A and B.

Energized relay A′ operates break contacts A′–1 in lead A1 to interrupt circuit continuity and release relay 52 in line circuit 38. As more fully described in the aforementioned C. E. Morse et al. copending patent application, relay 52 when released connects holding resistors 54 and 55 across leads T1 and R1 by releasing make contacts 57 and break contacts 59 of relay 52 and operating make contacts 61 of slow release relay C (not shown).

Energized relay A′ also operates make contacts A′–3 to shunt down relay A over a path from power supply 48, resistor 46, operated transfer make contacts B–2, operated make contacts B–3, A′–3, and break contacts B′–1 to ground. Relay A releases and at its transfer back contacts A–4 maintains a holding path for relay B to ground through contacts B–3, A′–3, and B′–1. When relay B′ is energized in response to the activation of relay A′, break contacts B′–1 are operated to deprive relay B of the ground through transfer break contacts A–4. This causes relay B to release. De-energized relay B restores make contacts B–5 and B–6 in leads R1 and T1, respectively, to disconnect speakerphone 32 from line 24. Make contacts B–4 in lead A1 are also restored. Transfer make contacts B′–1 operated maintain a ground on lead SS keeping speakerphone 32 turned on.

In this manner, circuit continuity for line 24 is first broken on lead A1 before speakerphone 32 is disconnected from leads T1 and R1 by the release of relay B and line 22 is not connected to speakerphone 32 by the operation of relay B′ until relay B has completely released.

*Call termination*

A call on line 22 or on line 24 is terminated by reoperating line pick-up key 34 or 30, respectively. To release a call which had priorly been picked up on line 24, for example, nonlocking line pick-up key 30 is depressed to operate make contacts 30–1 and shunt the winding of relay A through a path from power supply 48, resistor 46, operated transfer make contacts B–2, and operated make contacts 30–1 to ground. This shunt de-energizes the winding of relay A and causes the relay to release and restore transfer contacts A–4. Restored transfer make contacts A–4 disconnect ground from the windings of relays A and B. During this condition a temporary holding path is provided for relay B through a path from power supply resistor 50, winding of relay B, transfer break contacts A–4 and operated make contacts 30–1 to ground. Releasing the nonlocking pick-up key 30 restores make contacts 30–1 and breaks circuit continuity through these contacts to ground for the winding of relay B. De-energized relay B releases make contacts B–4, B–5, and B–6 in leads A1, R1, and T1, respectively, thereby disconnecting station 26 from line 24 and releasing line circuit 38 in the manner described in the aforementioned C. E. Morse et al. patent application. Release contacts B–1 remove ground from lead SS turning off the speakerphone.

Accordingly, our invention provides a key telephone system that eliminates the conventional switchhook and hold keys which have characterized those devices in the prior art.

It is to be understood that the above descriptive arrangements are merely illustrative of the principles of this invention and various other arrangements may be devised by those skilled in the art without departing from the spirit and scope of the invention.

What is claimed is:

1. A key telephone circuit for operation with a plurality of telephone lines comprising a nonlocking pick-up key individual to each of said lines, any of said keys being operable to extend a talking connection to the telephone set of said key circuit, means responsive to the operation of one of said keys and the subsequent operation of another of said keys for holding the line individual to said one key, and means responsive to a reoperation of said another of said keys for releasing said line individual thereto.

2. A key telephone circuit according to claim 1 wherein said means responsive to operation of said keys comprise first means responsive to one of said keys for connecting the telephone set to the respective line and subsequently releasing said first means to disconnect the telephone set from said respective line, and second means operated by another of said keys individual to another of said lines for holding a call on said line connected by said first means.

3. A key telephone circuit according to claim 2 wherein said second means comprises contact means in said line connected by said first means for holding a call on said line and further contact means in said first means for shunting down one portion of said first means and breaking the circuit continuity of a second portion of said first means to deactivate said first means and disconnect the telephone set from said line.

4. A key telephone circuit comprising a plurality of telephone lines, a plurality of line circuits each individual to a respective one of said lines, a pick-up key associated with each of said lines, a pair of relay means respective to each of said lines, a first relay of said pair of relay means normally being operable upon the actuation of the pick-up key respective to the same one of said lines for preparing a path to operate the second relay of said pair respective to said line, said second relay being operated upon the release of said pick-up key to establish the picked-up condition of said same one of said lines, and circuit means controlled by the actuation of another of said pick-up keys when said one of said lines is in said picked-up condition for establishing the holding condition of said one of said lines, said circuit means comprising contact means controlled by the operation of the first relay of said pair of relay means respective to another of said lines for releasing said first relay of said pair of relay means respective to said one of said lines, said released first relay thereupon causing said second relay of said pair respective to said one line to be held until the operation of said second relay of said pair respective to said another of said lines, and circuit means controlled by the operation of said second relay of said pair respective to said another of said lines for releasing said second relay of said pair respective to said one line when said picked-up condition of said another of said lines is established.

5. A key telephone circuit comprising a plurality of telephone lines, a nonlocking pick-up key individual to each of said lines, first and second relay means associated with each of said pick-up keys, said first relay means being operated by the operation of its associated pick-up key to prepare a path for operating said second relay means, said second relay means being operated by the release of said pick-up key to extend a talking connection from a respective one of said telephone lines to the telephone set of said key circuit.

circuit means controlled by the operation of said second relay means associated with one of said pick-up keys for preparing a path to release said first relay means associated therewith, circuit means controlled by the operation of said first relay means associated with another of said pick-up keys for completing said prepared path to release said first relay means associated with said one of said pick-up keys whereby said one of said lines is held, and circuit means controlled by the operation of said second relay means associated with said another of said pick-up keys for opening said prepared path to release said second relay means associated with said one of said lines whereby said talking connection thereto is disconnected.

6. A key telephone circuit according to claim 5 wherein said first relay means associated with another of said pick-up keys comprises means for preparing a path for operating said second relay means associated with said another pick-up key, and said second relay means associated therewith being operated by the release of said another pick-up key to extend a talking connection from a respective one of said telephone lines to the telephone set of said key circuit.

References Cited

UNITED STATES PATENTS 3,114,801 12/1963 Kirkham ------------ 179—99

KATHLEEN H. CLAFFY, *Primary Examiner.*

BARRY P. SMITH, *Assistant Examiner.*